Patented May 12, 1942

2,282,988

UNITED STATES PATENT OFFICE 2,282,988

PROCESS OF MOTHPROOFING

Joseph W. Creely, Oaklyn, N. J., assignor to Eavenson & Levering Co., a corporation of New Jersey No Drawing. Application November 19, 1941, Serial No. 419,702

7 Claims. (Cl. 8—136.5)

This invention relates to moth-proofing textile or like fibrous material in such manner that the moth-proofing effect persists after repeated laundering, dry cleaning or long exposure of the treated material to bright sunlight.

Many attempts have been made to accomplish this result by applying moth repellent or poisonous substances to the fibres. Such a process may give excellent moth-proofing while the application is new, but its life under washing or dry cleaning has not turned out to be satisfactory.

According to my invention I have solved this problem by hardening on the fibers a synthetic resin which makes a firm mechanical bond with the fiber and including with this resin a coupling agent which has sufficient affinity for the resin so that the resin will hold it in place, but which is of such a nature that it will serve to bond to the resin coated fabric an appropriate poisonous body. Such poisonous body is ordinarily applied as the final step.

In carrying out this invention, I have found that any of the organic bases will serve as coupling agents and that these can be appropriately bonded to the fibers by any of the aldehyde reacting resins.

While the coupling agents that are employed are organic bases, I have found that where discoloration must be avoided (as is usually the case) it is almost universally necessary that the resinous bodies be hardened by the use of an acid catalyst which would be interfered with by a strong base. This means that the pH of the resin mixture must be carefully adjusted to a point approaching neutrality and then a catalyst having a substantial buffer action and an acid reaction (such for example as ammonium chloride) should be employed. After the resin has been hardened in place together with the coupling agent, an appropriate moth repellent or poison—specifically a sulphonate—is added.

In carrying out the invention, the resin bonding agent may, as stated, be any of the usual resinous bodies formed by a reaction involving condensation with an aldehyde, principally formaldehyde. However, the phenol-formaldehyde resins, while serving to hold the moth-proofing agents in place, are not well suited to the invention because they tend to yellow and discolor the fibers, but where discoloration is not critical, they may be employed. The preferred types of resins used are the urea aldehyde type or the melamine formaldehyde resins. Aniline formaldehyde resins, like the phenols, tend to cause yellowing. In addition to the true resins, various other bodies which are hardened by the action of formaldehyde such as casein, gelatin, glue and the like may be employed, though they are not as permanent against harsh treatment as the true resins. While formaldehyde is the aldehyde ordinarily employed with resins of the type specified, other aldehydes such as acetaldehyde or furfuraldehyde may, under some circumstances, be used.

The coupling agent can be virtually any water soluble organic base, but I have found that best results are had with those organic bases containing nitrogen such as the quarternary ammonium compounds and the primary, secondary and tertiary amines. In addition, under some circumstances, the non-nitrogen containing bases such as the sulphonium and phosphonium compounds may be used.

As already stated, the bases, if strongly alkaline, should be brought to approximate neturality and for this purpose a mineral acid such as hydrochloric or sulphuric acid may be employed, or one may use organic acids such as are used in dyes like acetic or formic acid. In such case, the coupling agent really will be a salt. Such salts may be considered as ionizing when dissolved in water to give a negatively charged halogen or other acid ion and a complex residual organic group or ion that is positively charged. This positive charge on the organic base of the coupling agent is an important factor.

Examples of coupling agents that have the general properties described and that are especially satisfactory in my composition are the following: trimethyl benzyl ammonium chloride, triethyl monotoluyl ammonium chloride, isopropyl pyridinium chloride, tris (hydroxy methyl) aminomethane and 2-amino-2-methyl-1-propanol hydrochloride. Materials of these compositions that are sold under various trade names have been used to advantage such Triton K60, Sapamine KW, Intracol, and Irgamine L As the actual moth-proofing I employ a sulphonic acid compound including in its molecule an organic, negatively polar, moth-killing group. Such sulphonic acid compounds may be used in the acid form or in the form of a metal salt such as sodium or potassium sulphonate, for this compound is applied to the fabric and to the coupling agent in the presence of an acid which converts any metal sulphonate present to the corresponding free sulphonic acid. In other words, the sulphonate will have a definite negative charge.

The types of sulphonic acids that can be employed for killing moth larvae and other protein eating insect forms are known in the art and are referred to herein generally as "moth poisoning sulphonic acids." In general, they fall in the class of the water soluble, aromatic or alkyl-aromatic sulphonic acids. Examples of suitable materials that may be used are paradodecylbenzene sulphonic acid, ethyl-benzene sulphonic acid, isopropylbenzene sulphonic acid, diisopropyl-naphthalene sulphonic acid and diamyl sulfosuccinate.

It may be that some of the advantageous results of my process are due to the fact that when the organic base is fixed on the wool or other fiber by the resinous binder, it is itself adsorbed or held onto the wool in combination with the negative or acidic groups of the protein. This will tend to increase the adsorption and strength of combination of the organic sulphonate anion by the basic or positive groups of the protein. Complex organic ions such as these (which are similar to the chromophore ions of basic or acid dyes) have a much higher affinity for wool or other proteins than do simple inorganic ions. Also the adsorption or combination of an ion of high affinity by a material such as wool will increase and strengthen the adsorption or combination of another ion of high affinity but of opposite electrical charge. Because of these considerations, we refer to the sulphonates as being coupled to the organic bases, which may involve a chemical reaction, or may be of a more physical nature. In any event, when my process is carried out, the sulphonate bodies are bonded to the wool in a manner which holds them in place against extreme scouring or other treatment.

The binder and coupling agent are preferably supplied to the fibrous material to be mothproofed in the same aqueous medium and at the same time, while the sulphonic compound preferably is applied as a separate operation. Ordinarily the binder and coupling agent are applied first and the binder is subjected to an appropriate hardening treatment after which the sulphonic acid is added. I have found, however, that reasonably satisfactory results can be had if the sulphonic compound is first applied and later the coupling agent and binder are added.

Following usual practice, where the binder is a true resin a hardening catalyst should be employed and this should be one which at least develops an acid reaction under heat. Various types of catalysts for the various resins are well known in the art, but by way of example I have found that ammonium chloride will serve very well in my invention, but the actual selection of the catalyst may be left to the preference of the operator.

As regards the quantities of materials to be empolyed, the amount of resinous material used will depend in part upon whether or not stiffness in the fiber is desired or to be avoided. Ordinarily, from about 2 to 15 parts of resin for 100 parts of fiber to be treated will be employed though this may be increased up to say 20 parts per 100, if stiffness is not objected to. The percentages of coupling agent and sulphonic acid compound employed should be adjusted to each other but in general I have found that from 2 to 8 parts of sulphonic acid compound for 100 parts of the fiber will give satisfactory moth-proofing results, and under such circumstances the coupling agent should amount to about 0.25 to 2 parts for 100 parts of the fibrous material.

Smaller proportions than the minima of the above ranges do not give thoroughly satisfactory results, but under some circumstances results of value can be had with a 25% reduction from minimum, and on the high end an increase above the figures given ordinarily will not give an improved effect commensurate with the extra cost involved so that we can say an outside limit should not exceed the maximums given by more than 50%.

In applying the preparation, ordinarily the coupling agent and binder are dissolved or dispersed in water to give a moderately viscous solution or one containing from 2 to 6 parts of solid material for 100 parts of water. The textile or other fibrous material is then immersed in this solution. Excess solution is removed by squeezing or centrifuging. Residual water is dried out in any conventional manner and then the fibrous mass is subjected to an appropriate treatment to harden the resin. In the case of most resins, this will mean heating to a temperature of from 120 to 150° C. for from 10 to 30 minutes.

After the coupling agent and binder have been hardened in place, the fibrous material is dipped into a solution of the sulphonic acid compound. This solution is used in an amount such as that employed in dye baths, that is, there should be in the order of about 50 parts of water to 1 part of fiber.

The fibrous material is preferably boiled for a few minutes, say, from 10 to 30 minutes or longer in the sulphonic acid solution for the purpose of causing thorough penetration and completing any necessary interaction (whether this is chemical or physical) between the sulphonic acid compound and the coupling agent. The excess of solution is removed and the fibrous material is washed to remove inorganic acids, salts or other soluble materials present. It is then dried in any conventional manner.

While this is the preferred method of carrying out the process, a reversal of steps is possible, and in such case the fibrous material is boiled in the sulphonic acid compound, washed and then treated with the solution or dispersion in water of the coupling agent and binder. The finished product is then again washed and dried and the binder hardened in the manner appropriate to its nature.

This invention may be readily understood from the two following examples:

*Example No. 1*

A resin was prepared by reacting together one mol of urea, one mol of thiourea and 4 mols of formaldehyde. The urea and thiourea in powdered form were dissolved in the formaldehyde, in usual aqueous solution, which had been neutralized to a pH of between 6 and 8. The resin solution was allowed to stand over night at room temperature. A bath was made up comprising 100 parts of the resin solution as stated above, 5 parts of ammonium chloride and 5 parts of trimethyl benzyl ammonium chloride. This bath was prepared by dissolving the ammonium chloride and the coupling agent in 1000 parts of water, after which the resin solution was stirred in.

20 parts by weight of scoured wool were soaked in this bath long enough thoroughly to wet the fibrous material. The wool was squeezed out to remove excess solution and dried under forced air circulation at a temperature of 130° to 170° F. After being dried the temperature was raised to between 250° and 300° F. for from 10 to 30 minutes in order to cure the resin.

A bath was prepared by dissolving two parts of sodium diisopropyl naphthalene sulphonate, 2½ parts of Glauber's salt and 1.2 parts of concentrated sulphuric acid in 1000 parts of water. The wool treated as above was introduced into this bath cold and the temperature was then raised to the boiling point. It was boiled for from 20 to 30 minutes, removed, rinsed and dried. The resulting wool, even after repeated scourings, showed virtually no loss of weight when exposed to well-grown moth larvae for a period of one week.

*Example No. 2*

A bath was made up by dissolving 2 parts of sodium diamyl sulfosuccinate, 2½ parts of Glauber's salt and 1.2 parts of concentrated sulphuric acid in 1000 parts of water. 20 parts of woolen cloth was introduced into this bath, heated to boiling and boiled for about 30 minutes. After being washed and dried, it was introduced into a bath made up of 100 parts of resin solution as in Example No. 1, 5 parts of ammonium chloride and 5 parts of 2-amino-2-methyl-1-propanol hydrochloride, all of which were dissolved in 1000 parts of water. The woolen cloth was soaked in this bath at room temperature long enough thoroughly to wet it. It was then squeezed out to remove excess solution, dried under forced air circulation at a temperature of between 130° and 170° F. and then cured as before for from 20 to 30 minutes at a temperature of between 250° and 300° F. under forced air circulation. As before, this product showed virtually no loss of weight when exposed to moth larvae.

This process ordinarily will be used with wool either in the form of wool fiber, or as yarn or fabric, but may also be applied to various other bodies such as animal hair products including camel's hair, various synthetic protein fibers such as "lanital" and other keratin-containing fibers or yarns. It also may be used with other protein material such as hair, feathers or the like or with leather. All of these substances are intended to be included within the term "a fibrous substance" and when I refer to a substance being mothproofed or being subject to the attack of moths, I also intend to indicate the fact that it is made proof against the attack of other insects besides moths, such as carpet beetles, crickets or various forms of larvae.

The resulting products are permanently mothproofed. That is, they are resistant to attack by moth larvae or like insect forms after repeated scouring or laundering or cleaning with the common dry cleaning solvents. Exposure to ultra violet light does not appear to lower the moth resistance.

This moth-proofing treatment does not appear to disturb the dyeing properties of the textile and unless the binder is used purposely in excessive amounts, the fabric is not given undue stiffness.

It is understood that the specific examples given are for the purpose of illustrating a manner in which my invention may be carried out and are not in any way intended as limiting the scope of the invention.

What I claim is:

1. The method of moth-proofing a fibrous substance which comprises applying to such a substance a compound hardenable by the action of an aldehyde added together with an organic base, and applying in a separate step a moth poisoning sulphonic acid compound, said hardenable substance being hardened in place on the fibrous substance to bond the organic base to the fibers, which base serves in turn to couple on the sulphonic acid compound.

2. A method as specified in claim 1 in which the hardenable substance is a resin selected from the group consisting of the urea formaldehyde resins and the melamine formaldehyde resins.

3. A method as specified in claim 1, in which the organic base is a nitrogen-containing organic base.

4. A method as specified in claim 1 in which the organic base and hardenable compound are added first as a mixture and hardened in place on the fibers, after which the sulphonic acid compound is added.

5. A method of moth-proofing wool which comprises applying to the wool a mixture comprising an aldehyde resin together with an organic base brought to approximately the point of neutrality together with a catalyst which will cause the hardening reaction of the resin to take place on the acid side, hardening such resin in place on the wool and subsequently applying a moth poisoning sulphonic acid compound selected from the group consisting of the metal salts of alkyl, aromatic and alkyl-aromatic sulphonic acids, which are coupled in place by said organic base.

6. A moth-proofed body consisting of a fibrous mass of material normally subject to the attack of moths which carries an organic base bonded to the fibers by a synthetic resin hardened in place, to which base is coupled a moth poisoning sulphonic acid compound.

7. A structure as specified in claim 6 in which the organic base is a nitrogen-containing base and the sulphonic acid compound is the reaction product of a metal salt of a sulphonic acid applied to such base in the presence of free mineral acid.

JOSEPH W. CREELY.